(12) United States Patent
Amritphale et al.

(10) Patent No.: US 7,524,452 B2
(45) Date of Patent: Apr. 28, 2009

(54) LOW TEMPERATURE PROCESS FOR MAKING RADIOPAC MATERIALS UTILIZING INDUSTRIAL/AGRICULTURAL WASTE AS RAW MATERIAL

(75) Inventors: Sudhir Sitaram Amritphale, Regional Research Laboratory (IN); Navin Chandra, Regional Research Laboratory (IN); Narayanrao Ramakrishnan, Regional Research Laboratory (IN)

(73) Assignee: Council of Scientific and Industrial Research, New Delhi (IN)

( * ) Notice: Subject to any disclaimer, the term of this patent is extended or adjusted under 35 U.S.C. 154(b) by 92 days.

(21) Appl. No.: 11/026,115

(22) Filed: Jan. 3, 2005

(65) Prior Publication Data

US 2006/0066013 A1    Mar. 30, 2006

(30) Foreign Application Priority Data

Sep. 30, 2004    (IN) .......................... 1888/DEL/2004

(51) Int. Cl.
B28B 3/00    (2006.01)
(52) U.S. Cl. ...................................... 264/667; 264/669
(58) Field of Classification Search ................. 264/667, 264/669
See application file for complete search history.

(56) References Cited

U.S. PATENT DOCUMENTS

| | | | | |
|---|---|---|---|---|
| 3,169,932 A | * | 2/1965 | Aslam et al. | 264/667 |
| 3,886,244 A | * | 5/1975 | Bayer et al. | 264/44 |
| 4,368,273 A | * | 1/1983 | Puskas | 501/155 |
| 4,849,639 A | * | 7/1989 | Born et al. | 250/483.1 |
| 5,518,969 A | * | 5/1996 | Ragan | 501/32 |
| 2002/0123422 A1 | * | 9/2002 | Wagh et al. | 501/155 |
| 2005/0211930 A1 | * | 9/2005 | DeMeo et al. | 250/516.1 |

FOREIGN PATENT DOCUMENTS

| EP | 0 019 121 A2 | | 11/1980 |
|---|---|---|---|
| WO | WO2004/085334 | * | 10/2004 |

OTHER PUBLICATIONS

Bhasin, S.; Amritphale, S. S.; Chandra, N.; Effect of pyrophyllite additions on sintering characteristics of fly ash based ceramic wall tiles. Br Ceramic Trans. 102(2) pp. 83-86. 2003.*

"Bauxite Residue" International Aluminum Institute. http://www.world-aluminum.org/environment/challenges/residue.html. copyright 2000.*

Answer to Question #1742 Submitted to "Ask the Experts", Health Physics Society, Aug. 14, 2003 (http://hpsorg/publicinformation/ate/q1742.html), 1 page.

Quan Lin, et al., Synthesis, characterization and property studies of $Pb^{2+}$-containing optical resins, Polymer 41, 2000, pp. 8305-8309.

P. Soo, et al., The effect of gamma radiation on the strength of Portland cement mortars, Journal of Materials Science Letters 20, 2001, pp. 1345-1348.

Ching-Hwa Lee, et al., Recycling of Scrap Cathode Ray Tubes, Environ. Sci. Technol., 2002, 36, pp. 69-75, Department of Environmental Engineering, Republic of China.

J.A. Griggs, et al., Devitrification and microstructural coarsening of a fluoride-containing barium aluminosilicate glass, Journal of Materials Science 37, 2002, pp. 2017-2022, Kluwer Academic Publishers.

Narottam P. Bansal, Celsian formation in fiber-reinforced barium aluminosilicate glass-ceramic matrix composites, Materials Science and Engineering A342, 2003, pp. 23-27.

Kuo-Tong Lee, et al., Enhanced production of celsian barium aluminosilicates by a three-step firing technique, Materials Chemistry and Physics 71, 2001, pp. 47-52.

Lead-free X-Ray Shield Based on Special Composites and Multi-Layer Structures, May 15, 1997, 2 pages (Komposit.mat@g23.Relkom.ru).

* cited by examiner

*Primary Examiner*—Steven P Griffin
*Assistant Examiner*—Russell J Kemmerle, III
(74) *Attorney, Agent, or Firm*—Crowell & Moring LLP

(57) ABSTRACT

A low temperature process for making radiopac materials is disclosed. The process utilizes industrial/agricultural waste as raw materials and includes mixing 11-88% w/w of the industrial/agricultural waste materials, 11-88% w/w of an alkali or alkaline earth metal compound and 7-15% w/w of a phosphatic binder to obtain a homogenized mixture. The homogenized mixture is compressed at a pressure in the range of 100-300 $Kg/cm^2$ to obtain compacted green material samples. The compacted green material samples are baked for 1-3 hours in an Air oven in the temperature range of 90-130° C., and are sintered at a temperature in the range of 920 to 1300° C. for a soaking period of 1-3 hours under air environment in a muffle furnace to obtain the radiopac material.

19 Claims, No Drawings

LOW TEMPERATURE PROCESS FOR MAKING RADIOPAC MATERIALS UTILIZING INDUSTRIAL/AGRICULTURAL WASTE AS RAW MATERIAL

FIELD OF INVENTION

The present invention relates to a novel process for making radiopac materials.

The process of present invention is particularly useful for making radiopac materials useful for shielding of X-ray radiation. The radiopac materials contain the oxide of barium—an alkaline earth metal and oxide(s) of one or more of the elements such as silicon, iron, titanium and aluminum derived from fly ash (an industrial waste generated in thermal power plants), red mud (an industrial waste generated in aluminum industry), ash of rice husk (an agricultural waste) or pyrophyllite an underutilized clay mineral.

Usage of the radiopac materials obtained by the novel process of the present invention is in making ceramic tiles/bricks or incorporating in polymer matrix and woven fabrics to make curtains for shielding of X-ray radiation at ambient temperatures. The above ceramic tiles and bricks are also useful for the shielding of X-ray radiations at elevated temperatures up to 1300° C. and also posses good impact and crushing strengths. The ceramic tiles and bricks can be used for construction of diagnostic and CT scanner rooms to provide adequate shielding against X-ray photons.

BACKGROUND AND PRIOR ART REFERENCES

Generally the sheets of lead metal are used for X-ray radiation shielding. The other metals which are capable of shielding X-ray radiation include copper, aluminum, titanium (http://hpsorg/publicinformation/ate/q1742.html), iron/steel, chromium, magnesium and barium etc.(Quan Lin et al, Polymer 41 (2000) 8305-8309). Concrete is also often used as shielding material (P. Soo and L. M. Milian, J. Mat. Sci. Letters 20, 2001, 1345-1348). Polymers containing heavy metals in polymeric chains (Jpn Kokai Tokkyo Koho, 157092, 1985 and Jpn Kokai Tokkyo Koho, 98765,1986)) or metal oxides dispersed in polymer matrix also have radiopac properties (European Patent appl.19121). The lead/rare earths (Ching—hwa lee and Chi—Shiung His, Environ. Sci. Technol., 200,36,69-75 and Kompozit.mat@g23.Relkom.ru) and barium (J. A. Griggs et al, J. Mat. Sci. 37, 2002, 2017-2022 and (Narottam P. Bansal, Mat. Sci. & Enginnering A342, 2003, 23-27) containing glasses made from oxides of silicon/aluminum/zinc etc. also exhibit X-ray radiation shielding properties.

The drawbacks in the processes of making above mentioned X-ray shielding materials are as follows:

I. The processes for making X-ray radiation shielding materials based on lead metal, lead bearing glasses or lead compound dispersed polymer composites suffer due to toxicity of lead and/or poor strength and hardness. Further, the lead bearing tiles/sheets/bricks are significantly heavy in weight as the density of lead is 11.34 gm/Cm-$^2$. Another drawback of the lead bearing materials is that their melting points are low (melting point of lead is 325° C.), which prohibits their use at high temperatures.

II. The use of concrete for shielding X-ray radiations suffers on account of a gradual decrease in its mechanical strength with the period of exposure and inability to withstand high temperatures.

III. The processes of making barium alumino-silicate glasses suffer from the disadvantages of utilizing (a) non replenishable natural resources such as quartz and feldspar (b) the quartz and feldspar required in powder form are hard materials (hardness values of 7 and 6 respectively on the Moh's scale) and hence require very high grinding energy (c) require high sintering energy as the sintering is carried out for long durations (four hours to four weeks) in the temperature range 950°-1600° C. depending on the characteristics and chemical compositions of various constituents (Kuo-Tong Lee et al Mat. Chem. & Physics 71, 2001, 47-52).

IV. Processes utilizing oxides/fluorides of rare earths such as yettrium, Lanthanum, Cerium and Dysprosium etc. suffer from the drawback of (a) requirement of sintering at high temperatures and (b) utilization of costly and scaresely occurring Rare Earths the resources.

OBJECTS OF INVENTION

The main object of the present invention is to provide a novel process for making radiopac materials which obviates the drawbacks as detailed above.

Another object of the present invention is to utilize one or more of industrial/agricultural waste materials (e.g., red mud from aluminum production, fly ash from thermal power plants, pyrophyllite, an underutilized clay mineral and agrowaste—rice husk ash) containing one or more of the following elements namely silicon, aluminum, titanium and iron and thus obtain the radiopac materials which are non toxic as they are lead free.

Still another object of the present invention is to develop a novel low temperature process for making radiopac materials utilizing above mentioned raw materials.

SUMMARY OF INVENTION

The present invention is particularly useful for making radiopac materials useful for shielding of X-ray radiation. The radiopac materials contain the oxide of barium—an alkaline earth metal and oxide(s) of one or more of the elements such as silicon, iron, titanium and aluminum derived from fly ash (an industrial waste generated in thermal power plants), red mud (an industrial waste generated in aluminum industry), ash of rice husk (an agricultural waste) or pyrophyllite and underutilized clay mineral. These industrial/agricultural waste materials contain various necessary constituents required for making radiopac materials namely silicon, titanium, iron and aluminum. Since the present novel process utilizes industrial/agricultural waste as raw materials instead of conventionally used non-replenishable and costly rare earth containing mineral resources such as feldspar, quartz and clays, the radiopac materials thus obtained are non toxic due to their lead free nature. The presence of different mineralizers in the raw materials used and use of phosphatic binders significantly helps in obtaining the radiopac materials, at relatively low temperatures of 920° C. itself and thus leads to saving of considerable heat energy. The radiopac materials obtained by the novel process of present invention are capable of withstanding ambient to high temperature and thus find wide applications. Further as the waste are generated in powder form, the use of these waste also helps in saving on the account of grinding energy.

DETAILED DESCRIPTION OF INVENTION

Accordingly, the present invention provides a novel process for making radiopac materials, which comprises of homogenizing the underutilized/waste raw materials namely, fly ash, red mud, pyrophyllite and rice husk silica (11-88%) with a compound of barium (11-88%) and a phosphatic binder (7-15%), compression of this raw mix in a steel mould at a pressure in the range of 100-300 Kg/cm$^2$ to obtain green samples, baking of the green samples so obtained for 1-3 hours in an Air Oven at 110° C., followed by soaking at a temperature in the range of 920 to 1300° C. for 1-3 hours under air environment in a muffle furnace.

In an embodiment of the present invention, the novel process of making radiopac materials is carried out at a lower temperature in the range of 920-1300° C.

In an another embodiment of the present invention, the novel process of making radioac materials utilizes raw materials such as fly ash and red mud which are available in huge quantity and are generated in powder form itself and thus leads to saving of grinding energy, which otherwise is necessary for grinding of raw materials.

In yet another embodiment of the present invention, the novel process of making radiopac materials does not requires the use of otherwise conventionally used lead metal or its compounds which are toxic in nature.

In still another embodiment of the present invention, the novel process of making radiopac materials utilizes fly ash and red mud industrial waste generated in powder form in huge quantity, these industrial waste, otherwise are posing environmental problem and these waste can be utilize to make highly value added, alternate radiopac materials in the form of structural materials such as tiles, bricks, panels and envelopes, which can withstand ambient as well high temperature up to 1300° C.

The complete description of all the process steps using various ingredients in the present invention of a novel process of making radiopac material involves use of either of the (i) fly ash waste material containing 62-64% silica, 4-6% iron oxide, 21-27% alumina, 1.5-2.5% manganesium oxide, 4-5% potassium oxide, 0.5-1.5% calcium oxide. (ii) Red mud waste material containing 8-10% silica, 28-31. % iron oxide, 20-24% alumina, 19-21% titanium oxide, 6-7% sodium oxide and 4-5% calcium oxide. (iii) Rice husk silica containing 92-93% silica, 0.8-1.0% iron oxide, magnesium oxide 1.8-2.5%, 1.70-2.50% sodium oxide and 2-3% calcium oxide and potassium oxide 0.5-1.5%. (iv) Pyrophyllite containing silica 66%, alumina 23-25%, iron oxide 2-3%, titanium oxide 0.98-1.3%, magnesium oxide 0.5-0.82%, calcium oxide 1-2%, potassium oxide 0.37-0.50%, sodium oxide 0.13-0.25% and homogenizing these raw materials along with barium carbonate in the range of 11-88% and a alkali phosphatic binder namely sodium hexa meta phosphate in the range of 7-15%. The homogenized raw materials mix so prepared is then compacted in a steel mould at a pressure in the range of 100-300 kg/Cm$^2$ to obtain green samples. The green samples are then dried in an air oven at 110° C. for a period of 1-3 hours. The dried samples are then fired in the temperature range of 920-1300° C. for a soaking time of 1-3 hours in a muffle furnace under air environment. The radiopac materials so obtained are evaluated for their X-ray attenuation characteristics using a) X-ray normal beam qualities and characteristics for beam quality of 250 kV with 1 mm Cu-filter, 200 kV with 0.5 mm Cu-filter 150 kV with 0.35 Cu-filter and 100 kV with 0.2 mm Cu-Filter. The attenuation of the radiopac materials samples in combination of four samples for (i) beam quality of 250 kV with 1.0 mm Cu-filter were found to be in the range of 0.0588-0.4054 I/Io i.e the attenuation is found to be in the range of 60-95% (ii) beam quality of 200 kV with 0.5 mm Cu-filter in combination of three samples were found to be in the range of 0.048-0.2609 I/Io i.e. the attenuation is found to be in the range of 74-95% (iii) beam quality of 150 kV with 0.35 mm Cu-filter in combination of two samples were found to be in the range of 0.03519-0.1322 I/Io i.e. the attenuation is found to be in the range of 87-97% and (iv) beam quality of 100 kV with 0.2 mm Cu-filter with one sample was found to be 0.0357 I/Io i.e. the attenuation is found to be 97%. The X-ray attenuation test using standard filter at respective kV were also carried out using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the results of X-ray attenuation obtained are given in the respective examples. The impact strength and water absorption characteristics/properties of the radiopac materials were also evaluated using standard method and found to posses the impact strength values in the range of 0.020-0.029 kgf.cm$^{-1}$; water absorption in the range of 5-12% (w/w) for the sample made using various compositions of the raw materials.

The novelty of the present invention with respect to prior art lies in the fact that (i) the process of present invention obviates the need of use of toxic lead and costly rare earth containing compounds/raw materials (ii) the process of present invention utilizes waste materials which inherently contains the various important elements necessary for making radiopac materials, such as silicon, aluminum, iron and titanium. (iii) The conventional radiopac materials based on barium are basically glasses and hence have poor impact strength, whereas in the present novel process of invention the use of barium has been made to make radiopac materials which are ceramic in nature and posses good impact strength and are capable of withstanding relatively high temperatures. Further, (iv) as the radiopac materials made in the present novel process of invention are barium and phosphate containing materials and therefore does not loose mechanical strength as otherwise found in the use of concrete materials used conventionally and (v) the presence of alkali and alkaline metal oxides in the waste materials used in the novel process of present invention act as mineralizers and also the use of phosphatic binders helps in obtaining the radiopac materials at lower temperature of 920° C. as against 1400° C. required in making barium based glasses by conventional process.

The following examples are given by way of illustration and therefore should not be construed to limit the scope of the present invention.

EXAMPLE-1

The red mud waste material containing 8.0% silica, 31.0% iron oxide, 20.0%, alumina, 21.0% titanium oxide, 6.0% sodium oxide and 4.0% calcium oxide and the rice husk silica containing 92.2.0% silica, 0.8% iron oxide, magnesium oxide 1.8%, 1.70% sodium oxide and 2.1% calcium oxide and potassium oxide 0.5%, was used in the present example.

For making samples of radiopac material 40 gms of red mud, 50 gms of barium carbonate, and 10.0 gms of sodium hexameta phosphate were mixed thoroughly to obtain a homogeneous powder mix. The mix so obtained was then compacted in a steel mould to obtain green samples (1) having 250 mm dia and 10 mm thickness and (ii) having 100 mm×100 mm×10.33 mm thickness. The green samples were then dried in an air oven for a duration of two hours at 110° C. The dried samples were then sintered at 1000° C. for a period of one hours in air environment.

The sintered sample so prepared and having thickness value of 10 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the attenuation for various kV i.e. at 250, 200, 150 and 100 kV were found to be 28, 35, 66 and 77% respectively.

The impact strength of the sample was found to be 0.023 kgfm.cm-1 and water absorption in the range of 8.0%.

EXAMPLE-2

The fly ash waste material containing 62.12% silica, 5.55% iron oxide, 21.30% alumina, 1.58% magnesium oxide, 4.24% potassium oxide, 0.53% calcium oxide and rice husk silica containing 92.2.0% silica, 0.8% iron oxide, 1.8% magnesium oxide, 1.70% sodium oxide, 2.1% calcium oxide and potassium oxide 0.5%, was used in the present example For making samples of radiopac material 40 gms of fly ash, 50 gms. of barium carbonate, and 10.0 gms of sodium hexameta phosphate were mixed thoroughly to obtain a homogeneous powder mix. The mix so obtained was then compacted in a steel mould to obtain green samples (1) having 250 mm dia and 10 mm thickness and (ii) having 100 mm×100 mm×15.20 mm thickness. The green samples were then dried in an air oven for a duration of two hours at 110° C. The dried samples were then sintered at 950° C., for a period of two hours in air environment.

The sintered sample so prepared and having thickness value of 10 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the attenuation for various kV i.e. at 250, 200, 150 and 100 kV were found to be 29, 38, 64 and 85% respectively.

The impact strength of the sample was found to be 0.024 kgfm.cm-1 and water absorption in the range of 9.0%.

EXAMPLE-3

The red mud waste material containing 8.0% silica, 31.0% iron oxide, 20.0% alumina, 21.0% titanium oxide, 6.0% sodium oxide and 4.0% calcium oxide and the rice husk silica containing 92.2.0% silica, 0.8% iron oxide, magnesium oxide 1.8%, 1.70% sodium oxide and 2.1% calcium oxide and potassium oxide 0.5%, was used in the present example.

For making samples of radiopac material 53 gms of red mud, 40 gms of barium carbonate, and 7.0 gms of sodium hexameta phosphate were mixed thoroughly to obtain a homogeneous powder mix. The mix so obtained was then compacted in a steel mould to obtain green samples(1) having 250 mm dia and 17 mm thickness and (ii) having 100 mm×100 mm×10.70 mm thickness. The green samples were then dried in an air oven for a duration of two hours at 110° C. The dried samples were then sintered at 1100° C. for a period of one hours in air environment.

The sintered sample so prepared and having thickness value of 17 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the attenuation for various i.e. at 250, 200, 150 and 100 kV were found to be 37, 44, 71 and 77% respectively.

The impact strength of the sample was found to be 0.021 kgfm.cm−1 and water absorption in the range of 11.0%.

EXAMPLE-4

The fly ash waste material containing 62.12% silica, 5.55% iron oxide, 21.30% alumina, 1.58% magnesium oxide, 4.24% potassium oxide, 0.53% calcium oxide and rice husk silica containing 92.2.0% silica, 0.8% iron oxide, 1.8% magnesium oxide, 1.70% sodium oxide, 2.1% calcium oxide and potassium oxide 0.5%, was used in the present example For making samples of radiopac material 47 gms of fly ash, 40 gms. of barium carbonate, and 13.0 gms of sodium hexameta phosphate were mixed thoroughly to obtain a homogeneous powder mix. The mix so obtained was then compacted in a steel mould to obtain green samples(1) having 250 mm dia and 10 mm thickness and (ii) having 100 mm×100 mm×15.20 mm thickness. The green samples were then dried in an air oven for a duration of two hours at 110° C. The dried samples were then sintered at 920° C., for a period of 2 hours in air environment.

The sintered sample so prepared and having thickness value of 10 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2A1), and at 100 kV with (5Cu+2A1) and the attenuation for various kV i.e. at 250, 200, 150 and 100 kV were found to be 24, 34, 60 and 78% respectively.

The impact strength of the sample was found to be 0.020 kgfm.cm−1 and water absorption in the range of 12.0%.

EXAMPLE-5

The fly ash waste material containing 62.12% silica, 5.55% iron oxide, 21.30% alumina, 1.58% magnesium oxide, 4.24% potassium oxide, 0.53% calcium oxide and rice husk silica containing 92.2.0% silica, 0.8% iron oxide, 1.8% magnesium oxide, 1.70% sodium oxide, 2.1% calcium oxide and potassium oxide 0.5%, was used in the present example For making samples of radiopac material 70 gms of fly ash, 20 gms of barium carbonate, and 10.0 gms of sodium hexameta phosphate were mixed thoroughly to obtain a homogeneous powder mix. The mix so obtained was then compacted in a steel mould to obtain green samples(1) having 250 mm dia and 12 mm thickness and (ii) having 100 mm×100 mm×15.20 mm thickness. The green samples were then dried in an air oven for a duration of two hours at 110° C. The dried samples were then sintered at 1300° C., for a period of one hours in air environment.

The sintered sample so prepared and having thickness value of 12 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the attenuation for various kV i.e. at 250, 200, 150 and 100 kV were found to be 26, 27, 45 and 64% respectively.

The impact strength of the sample was found to be 0.028 kgfm.cm−1 and water absorption in the range of 7.0%.

EXAMPLE-6

The fly ash waste material containing 62.12% silica, 5.55% iron oxide, 21.30% alumina, 1.58% magnesium oxide, 4.24% potassium oxide, 0.53% calcium oxide and rice husk silica containing 92.2.0% silica, 0.8% iron oxide, 1.8% magnesium oxide, 1.70% sodium oxide, 2.1% calcium oxide and potassium oxide 0.5%, was used in the present example For making samples of radiopac material 80 gms of fly ash, 10 gms. of barium carbonate, and 10.0 gms of sodium hexameta phosphate were mixed thoroughly to obtain a homogeneous powder mix. The mix so obtained was then compacted in a steel mould to obtain green samples(1) having 250 mm dia and 13 mm thickness and (ii) having 100 mm×100 mm×20 mm thickness. The green samples were then dried in an air oven for a duration of two hours at 110° C. The dried samples were then sintered at 1200° C. for a period of one hours in air environment.

The sintered sample so prepared and having thickness value of 12 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5Sn+ 2Al), and at 100 kV with (5Cu+2Al) and the attenuation for various i.e. at 250, 200, 150 and 100 kV were found to be 18, 20, 34 and 49% respectively.

The impact strength of the sample was found to be 0.027 kgfm.cm−1 and water absorption in the range of 11.0%.

EXAMPLE-7

The red mud waste material containing 8.0% silica, 31.0% iron oxide, 20.0% alumina, 21.0% titanium oxide, 6.0% sodium oxide and 4.0% calcium oxide and the rice husk silica containing 92.2.0% silica, 0.8% iron oxide, magnesium oxide 1.8%, 1.70% sodium oxide and 2.1% calcium oxide and potassium oxide 0.5%, was used in the present example.

For making samples of radiopac material 70 gms of red mud, 20 gms of barium carbonate, and 10 gms of sodium hexameta phosphate were mixed thoroughly to obtain a homogeneous powder mix. The mix so obtained was then compacted in a steel mould to obtain green samples(1) having 250 mm dia and 9 mm thickness and (ii) having 100 mm×100 mm×10.70 mm thickness. The green samples were then dried in an air oven for a duration of two hours at 110° C. The dried samples were then sintered at 1000° C. for a period of one hours in air environment.

The sintered sample so prepared and having thickness value of 9 mm thickness was evaluated for its X-ray attenuation test with standard filter at respective kV using Narrow beam X-ray qualities at 250 kV with (3Pb+2Sn+2Al) filter, 200 kV with (1Pb+2Cu+3Sn+2Al), at 150 kV with (2.5 Sn+2Al), and at 100 kV with (5Cu+2Al) and the attenuation for various i.e. at 250, 200, 150 and 100 kV were found to be 19, 28, 43 and 60% respectively.

The impact strength of the sample was found to be 0.025 kgfm.cm−1 and water absorption in the range of 11.0%.

EXAMPLE-8

The red mud waste material containing 8.0% silica, 31.0% iron oxide, 20.0% alumina, 21.0% titanium oxide, 6.0% sodium oxide and 4.0% calcium oxide and the rice husk silica containing 92.2.0% silica, 0.8% iron oxide, magnesium oxide 1.8%, 1.70% sodium oxide and 2.1% calcium oxide and potassium oxide 0.5%, was used in the present example.

For making samples of radiopac material 40 gms of red mud, 50 gms of barium carbonate, 20 gms rice husk silica and 10 gms of sodium hexameta phosphate were mixed thoroughly to obtain a homogeneous powder mix. The mix so obtained was then compacted in a steel mould to obtain green samples(1) having 250 mm dia and 44.40 mm thickness and (ii) having 100 mm×100 mm×15.20 mm thickness. The green samples were then dried in an air oven for a duration of two hours at 110° C. The dried samples were then sintered at 1200° C. for a period of two hours in an air environment.

The sintered sample so prepared was tested for Normal beam X-ray attenuation characteristics, impact strength and water absorption properties. The attenuation of the sample for beam quality of 100 kV with 0.2 mm Cu-filter was found to be 0.0588 I/Io.

The impact strength and water absorption was found to be 0.20 kgfm.cm−1 and 12% respectively.

EXAMPLE-9

The fly ash waste material containing 62.12% silica, 5.55% iron oxide, 21.30% alumina, 1.58% magnesium oxide, 4.24% potassium oxide, 0.53% calcium oxide and rice husk silica containing 92.2.0% silica, 0.8% iron oxide, 1.8% magnesium oxide, 1.70% sodium oxide, 2.1% calcium oxide and potassium oxide 0.5%, was used in the present example For making samples of radiopac material 35 gms of fly ash, 55 gms. of barium carbonate, and 7.0 gms of sodium hexameta phosphate were mixed thoroughly to obtain a homogeneous powder mix. The mix so obtained was then compacted in a steel mould to obtain green samples(i) having 250 mm dia and 10.30 mm thickness and (ii) having 100 mm×100 mm×10.30 mm thickness. The green samples were then dried in an air oven for a duration of two hours at 110° C. The dried samples were then sintered at 980° C. for a period of three hours in air environment.

The radiopac materials so obtained was evaluated for its X-ray attenuation characteristics using a) X-ray normal beam qualities and characteristics for beam quality of 250 kV with 1 mm Cu-filter, 200 kV with 0.5 mm Cu-filter 150 kV with 0.35 Cu-filter and 100 kV with 0.2 mm Cu-Filter and found to have I/Io values 0.4054, 0.2609, 01322 and 0.0357 for various kV of normal X-ray beam quality i.e. at 250, 200, 150 and 100 kV values respectively and thus the X-ray attenuation for these kV are found to be 60, 74, 87 and 97% respectively.

The impact strength of the sample was found to be 0.023 kgfm.cm−1 and water absorption 6.8.0%.

The half value thickness (HVT) for different energies of X-ray photons for the Ceramic material made from the radiopac material of the present invention was computed and compared with concrete and Lead materials. Refer Table-I below.

TABLE I

| | HVT (cm) | | |
| --- | --- | --- | --- |
| KVp of X-ray beam | Lead | Concrete | Ceramic Material |
| 100 | 0.025 | 1.6 | 0.37 |
| 150 | 0.029 | 2.2 | 0.68 |
| 200 | 0.042 | 2.6 | 1.44 |
| 250 | 0.080 | 2.8 | 2.04 |

It was found that the Ceramic material, if converted to thick slab of about 6" thickness, can be used for the construction of diagnostic and CT scanner room to provide adequate shielding against X-ray photons.

The main advantages of the present invention are:
I. The novel process of present invention utilizes wastes namely fly ash (generated in thermal power plants), red mud (generated in aluminum production), rice hulls silica (an agro-waste) and pyrophyllite (an underutilized mineral) in place of non-repleneshible mineral resources such as feldspar, quartz and clays and obviates the need of use of lead (toxic in nature) and rare earth containing compounds/raw materials II. The novel process of present invention substantially utilizes waste materials, which inherently contain the various important elements such as silicon, aluminum, iron and specially titanium, necessary for obtaining radiopac materials.

III. The conventional radiopac materials based on barium are basically glasses and hence have poor mechanical strength, whereas in the present novel process of invention the use of barium has been made to make radiopac materials which are ceramic in nature and posses good (mechanical) impact strength and are capable of withstanding relatively high temperatures.

IV. The presence of alkali and alkaline metal oxides in the waste materials used in the novel process of present invention act as mineralizers and additionally use of phospahtic binders helps in obtaining the desired radiopac materials at lower temperature of 920° C. as against 1400° C. otherwise required in obtaining barium alumino-silicate glasses containing radiopac materials.

V. The novel process of present invention is carried out at a low temperature in the range of 920-1300° C. for a soaking period of 1-3 hours only.

VI. The novel process of present invention is useful for converting a variety of different wastes into a value added product viz., radiopac materials useful for attenuation of X-ray radiation at ambient as well as high temperatures.

VII. The novel process of present invention helps in saving the cost of grinding energy as the solid waste used as raw materials in the process of present invention are generated in the powder form itself.

We claim:

1. A low temperature process for making radiopac materials utilizing industrial/agricultural waste as raw materials, said process comprising the steps of:
   a) mixing 11 - 88% w/w of said industrial/agricultural waste materials, 11-88% w/w of an alkali or alkaline earth metal compound and 7-15% w/w of a phosphatic binder to obtain a homogenized mixture,
   b) compressing said homogenized mixture at a pressure in the range of 100-300 Kg/cm$^2$ to obtain compacted green material samples,
   c) baking said compacted green material samples for 1-3 hours in an Air oven in the temperature range of 90-130° C., and
   d) sintering at a temperature in the range of 920 to 1300° C. for a soaking period of 1-3 hours under air environment in a muffle furnace to obtain the said radiopac material,
   wherein said industrial/agricultural waste materials comprise fly ash, red mud, pyrophyllite and rice husk silica, and
   wherein pyrophyllite comprises silica 66%, alumina 23-25%, iron oxide 2-3%, titanium oxide 0.98-1.3%, magnesium oxide 0.5 0.82%, calcium oxide 1-2%, potassium oxide 0.37-0.50% and sodium oxide 0.13-0.25%.

2. A low temperature process for making radiopac materials as claimed in claim 1, wherein fly ash is in the range of 30-60% w/w.

3. A low temperature process for making radiopac materials as claimed in claim 1, wherein red mud is in the range of 25-70% w/w.

4. A low temperature process for making radiopac materials as claimed in claim 1, wherein pyrophyllite is in the range of 35-55% w/w.

5. A low temperature process for making radiopac materials as claimed in claim 1, wherein the fly ash waste comprises 62-64% silica, 4-6% iron oxide, 21-27% alumina, 1.5-2.5% manganesium oxide, 4-5% potassium oxide and 0.5-1.5% calcium oxide.

6. A low temperature process for making radiopac materials as claimed in claim 1, wherein the red mud waste material comprises 8-10% silica, 28-31% iron oxide, 20-24% alumina, 19-21% titanium oxide, 6-7% sodium oxide and 4-5% calcium oxide.

7. A low temperature process for making radiopac materials as claimed in claim 1, wherein said alkaline earth metal compound is selected from the group comprising barium carbonate, barium nitrate, barium sulphate, barium chloride and barium hydroxides.

8. A low temperature process for making radiopac materials as claimed in claim 1, wherein said phosphatic binder is selected from the group comprising sodium hexa meta phosphate, di-sodium hydrogen phosphate, di-potassium hydrogen phosphate, phosphoric acid and sodium dihydrogen phosphate.

9. A low temperature process for making radiopac materials as claimed in claim 1, wherein said phosphatic binder is in the range of 10-15%w/w.

10. A low temperature process for making radiopac materials as claimed in claim 1, wherein compressing of said homogenized mixture is done at a pressure in the range of 200-300 Kg/cm$^2$.

11. A low temperature process for making radiopac materials as claimed in claim 1, wherein the compacted green materials are obtained in the form of ceramic tiles, pallets or cubes.

12. A low temperature process for making radiopac materials as claimed in claim 1, wherein compacted samples are baked in the temperature range of 100-110° C.

13. A low temperature process for making radiopac materials as claimed in claim 1, wherein sintering is done at a temperature in the range of 1100-1300° C.

14. A low temperature process for making radiopac materials as claimed in claim 1, wherein the soaking period is in the range of 2-3 hours.

15. A low temperature process for making radiopac materials as claimed in claim 1, wherein radiopac material is obtained in the form of ceramic tiles, pallets or cubes.

16. A low temperature process for making radiopac materials as claimed in claim 1, wherein the Half Voltage Thickness (HVT) of the Ceramic material made from the said radiopac material is in the range of 0.37 to 2.04 for X-ray beam energies ranging between 100 to 250 kVp.

17. A low temperature process for making radiopac materials as claimed in claim 1, wherein the impact strength of the radiopac material is in the range of 0.02-0.029 kgf.cm$^{-1}$.

18. A low temperature process for making radiopac materials as claimed in claim 1, wherein the water absorption capacity of the radiopac material is in the range of 5-12% (w/w).

19. A low temperature process for making radiopac materials as claimed in claim 1, wherein said raw materials are the industrial/agricultural wastes generated in powder form.

* * * * *